(12) United States Patent
Madaiah et al.

(10) Patent No.: US 9,806,928 B2
(45) Date of Patent: Oct. 31, 2017

(54) COMMUNICATION SYSTEM AND METHOD FOR ACHIEVING LOW PEAK-TO-AVERAGE POWER RATIO

(71) Applicant: Tejas Networks Ltd., Bangalore (IN)

(72) Inventors: Vinod Kumar Madaiah, Karnataka (IN); Rohith C. Aralikatti, Karnataka (IN)

(73) Assignee: Tejas Networks Ltd., Bangalore (IN)

( * ) Notice: Subject to any disclaimer, the term of this patent is extended or adjusted under 35 U.S.C. 154(b) by 0 days.

(21) Appl. No.: 15/225,518

(22) Filed: Aug. 1, 2016

(65) Prior Publication Data

US 2017/0054584 A1    Feb. 23, 2017

(30) Foreign Application Priority Data

Jul. 31, 2015   (IN) .......................... 3988/CHE/2015

(51) Int. Cl.
*H04L 27/26*    (2006.01)

(52) U.S. Cl.
CPC ...... *H04L 27/2614* (2013.01); *H04L 27/2628* (2013.01)

(58) Field of Classification Search
CPC ............. H04L 27/2614; H04L 27/2615; H04L 27/2623; H04L 27/2624; H04L 27/2626; H04L 27/2628; H04J 2011/0009
USPC ............ 455/114.2, 114.3; 375/295, 296, 297
See application file for complete search history.

(56) References Cited

U.S. PATENT DOCUMENTS

| | | | | |
|---|---|---|---|---|
| 5,357,253 A | * | 10/1994 | Van Etten | G01S 7/4021 324/337 |
| 2001/0031014 A1 | * | 10/2001 | Subramanian | H04L 27/2608 375/260 |
| 2002/0150036 A1 | * | 10/2002 | Weerackody | H04L 27/2614 370/208 |
| 2003/0218973 A1 | * | 11/2003 | Oprea | H04B 7/0434 370/210 |
| 2004/0114691 A1 | * | 6/2004 | Kim | H04L 1/0618 375/260 |
| 2006/0050698 A1 | * | 3/2006 | Aytur | H04W 28/18 370/389 |
| 2006/0245472 A1 | * | 11/2006 | Pan | H04L 5/026 375/144 |

(Continued)

*Primary Examiner* — Siu Lee
(74) *Attorney, Agent, or Firm* — Amster, Rothstein & Ebenstein LLP

(57) ABSTRACT

The present disclosure generally relates to a wireless communication system that provides lower peak to average power ratio (PAPR). In particular, the present disclosure pertains to communication systems and methods for achieving low peak to average power ratio (PAPR) for transmitted symbols of wireless devices. In an aspect, the present disclosure relates to transmitter of a communication system, wherein the transmitter can include a source encoding module that is configured to generate source coded symbols from information to be transmitted by the transmitter, a preset values based multiplication module that is configured to multiply M symbols from the generated source coded symbols with M preset values to generate a first set of multiplied samples, and an N-point IDFT module that is configured to process the first set of multiplied samples to obtain a first set of inverse discrete Fourier transform (IDFT) samples for onward transmission to a receiver.

12 Claims, 7 Drawing Sheets

(56) References Cited

U.S. PATENT DOCUMENTS

| | | | |
|---|---|---|---|
| 2007/0189334 A1* | 8/2007 | Awad | H04L 27/2621 |
| | | | 370/491 |
| 2009/0073922 A1* | 3/2009 | Malladi | H04L 1/0004 |
| | | | 370/328 |
| 2011/0305296 A1* | 12/2011 | Van Nee | H04L 5/0048 |
| | | | 375/295 |
| 2016/0380683 A1* | 12/2016 | Murakami | H04B 7/0697 |
| | | | 375/295 |

* cited by examiner

COMMUNICATION SYSTEM AND METHOD FOR ACHIEVING LOW PEAK-TO-AVERAGE POWER RATIO

TECHNICAL FIELD

The present disclosure generally relates to a wireless communication system that provides lower peak to average power ratio (PAPR). In particular, the present disclosure pertains to communication systems and methods for achieving low peak to average power ratio (PAPR) for transmitted symbols of wireless devices.

BACKGROUND

Background description includes information that may be useful in understanding the present invention. It is not an admission that any of the information provided herein is prior art or relevant to the presently claimed invention, or that any publication specifically or implicitly referenced is prior art.

As new applications and services are being offered/consumed over wireless devices, there is an increasing need for high data rate in order to provide better customer satisfaction. At present, there are several communication standards such as orthogonal frequency division multiplexing (OFDM), single carrier-frequency division multiple access (SC-FDMA), and discrete fourier transform pre-coded orthogonal frequency division multiple access (DFT-pre-coded-OFDMA), among others that aim to achieve high data rates. In wireless communication standards such as OFDM and OFDMA, a signal is "spread out" and distributed among subcarriers, which send portions of the signal in parallel. High data rate is achieved by sending a signal in parallel over all possible channels available between the sender device, interchangeably referred to as transmitter hereinafter, and the receiver device, interchangeably referred to as receiver hereinafter. To minimize interference and loss of data during transmission, subcarrier frequencies are chosen in such as a way that the modulated data streams are orthogonal to each other, and cross-talk between the sub-channels is eliminated so that inter-carrier guard bands are not required. At receiver side, the receiver receives and reassembles the data that is sent in parallel over different channels and/or sub-channels by the transmitter.

These existing standards, also interchangeably referred to as protocols hereinafter, that are in use today, suffer from a high peak-to-average power ratio (PAPR), where PAPR of the symbols being transmitted using any of these standards is very high. PAPR, which is ratio of Peak Power with respect to Average Power of all the symbols that will be or are transmitted by the transmitter, is a performance parameter for measuring performance and/or efficiency of any transmitter/transceiver. PAPR is the peak amplitude squared (giving the peak power) divided by the RMS value squared (giving the average power), also calculated as square of crest factor. PAPR is a metric used to measure transmission efficiency of the RF power amplifier that is present within a radio transmitter, wherein ideal PAPR value of transmitted symbols by any transmitter should be one, and a high PAPR value dictates use of a linear transmit chain to avoid signal distortion that results in degraded error performance and spectral re-growth beyond intended signal bandwidth. In particular, power amplifier (PA) characteristics of the transmitter exhibit a saturation of output power with increased input power and hence present a nonlinear behavior. To ensure linearity with high PAPR, PA of the transmitter is operated away from saturation, i.e. with a power back-off.

Operating with a power back-off results in decreased transmission range of the transmitter and reduced power efficiency of the transmitter. Low PAPR value is also required for increased transmission range of the transmitter and to reduce the power consumption by the transmitter. By lowering the PAPR value, infrastructure cost for setting-up dense transmitter/transceiver network can also be controlled.

As the cost of setting-up and maintenance of access points/transmitters are increasing, it is better to utilize transmitters to their maximum/optimal potential, and use existing transmitters in the most efficient manner possible, and hence one of the primary objectives for any wireless communication scheme is to lower the PAPR of the transmitted symbols.

In prior art solutions, in order to achieve better PAPR, different techniques have been proposed including coding techniques, constellation reshaping, tone-reservation, and selective mapping, to name a few. For instance, amplitude clipping can be directly applied to reduce the PAPR. However, this clipping results in in-band and out-of-band distortions, which results in Symbol-Error-Rate (SER) degradation and out-of-band radiation respectively. To counter the effect of out-of-band distortions, a filter can be applied to the clipped signal. However, this might also regenerate new peaks. Hence, amplitude clipping reduces the PAPR at the expense of quantifiable distortion.

In another approach to reduce the PAPR, symbols are mapped into code words, and extra bit(s) are padded/added to those code words, and only code words that do not result in high PAPR are chosen for transmission. This technique requires lookup tables and exhaustive search for the best code word. Another approach known as selected mapping reduces PAPR by generating different sets of data blocks and transmitting one with the lowest PAPR. This is done by multiplying the initial data set with different phase sequences, and the optimal phase sequence is sent separately to the receiver as side information. A similar approach known as the Interleaving has also been used in past that uses inter leaver instead of a set of phase sequences to produce different sequences of the same data and transmits the one with the minimum PAPR.

Some methods use extra tones to add a peak-reducing signal to the original multicarrier signal to reduce the overall PAPR. This signal can be stripped off at the receiver using the information available at the reserved tones. However, none of the foregoing techniques have proven entirely satisfactory.

Another similar technique is proposed in SC-FDMA standard that performs a Fourier transform on the signal before mapping and sending the signal over the subcarriers to send it through a serial transmission (rather than in parallel transmission as used by ODFM). On reception of the transmission, an inverse Fourier transform is performed. Though, the SC-FDMA scheme offers a lower PAPR than the OFDM and OFDMA, effectiveness and/or efficiency of SC-FDMA scheme is limited by the choice of mapping scheme employed. Performance of SC-FDMA also suffers due to serial transmission.

Though several techniques/schemes as cited above have been proposed in the past, none of the foregoing techniques have proven entirely satisfactory. Therefore, there still exists a need for communication systems and methods for achieving low PAPR values for symbols transmitted by any transmitter.

OBJECTS OF THE INVENTION

An object of the present disclosure is to provide a communication system and method for achieving low peak to average power ratio over a transmitter of a wireless device.

Another object of the present disclosure is to provide a communication system and method for achieving low peak to average ratio and minimizing power consumption of the transmitter/access points.

Another object of the present disclosure is to provide a transmitter having a low PAPR value, which provides wide coverage.

An object of the present disclosure is to provide a method and system for maximum or optimal use of transmitter and communication channels.

SUMMARY

The present disclosure generally relates to a wireless communication system that provides lower peak to average power ratio (PAPR). In particular, the present disclosure pertains to communication systems and methods for achieving low peak to average power ratio (PAPR) for transmitted symbols of wireless devices.

In an aspect, the present disclosure relates to a transmitter of a communication system, wherein the transmitter can include a source encoding module that is configured to generate source coded symbols from information to be transmitted by the transmitter, a preset values based multiplication module that is configured to multiply M symbols from the generated source coded symbols with M preset values to generate a first set of multiplied samples, and an N-point IDFT module that is configured to process the first set of multiplied samples to obtain a first set of inverse discrete Fourier transform (IDFT) samples for onward transmission to a receiver.

In an aspect, the preset values based multiplication module can be further configured to split source coded symbols into a plurality of blocks, each block having M samples, wherein each block can be multiplied sample by sample with the M preset values to generate the first set of samples. In another embodiment, the M preset values can be obtained from any or a combination of mathematical distribution(s). Examples of such mathematical distributions include but are not limited to Gaussian distribution, Soliton distribution, Rayleigh distribution, Rician distribution, Inverse Gaussian distribution, Raised Cosine distribution, and Root raised Cosine distribution.

In another aspect, the receiver can include an N-point DFT module that can be configured to process the received first set of IDFT samples to obtain a first set of DFT samples, and an inverse preset values based multiplication module that can be configured to multiply the first set of DFT samples with reciprocal of the M preset values to generate the source coded symbols. In another aspect, the receiver can further include a source decoding module that is configured to decode the source coded symbols to retrieve the information transmitted by the transmitter. According to an embodiment, the receiver can further be configured to filter the received first set of IDFT samples to correct noise before processing the received first set of IDFT samples. In an aspect, the transmitter and the receiver can be connected through a communication channel.

According to one embodiment, one or more zeros can be appended to the first set of multiplied samples before conversion to the first set of IDFT samples to enable compression in frequency domain. According to another embodiment, sub-carrier mapping can be performed on the first set of multiplied samples before conversion to the first set of IDFT samples to enable compression in frequency domain.

In an aspect, the N-point IDFT module can be implemented as an N-point Inverse Fast Fourier Transform (IFFT), wherein $N>=M$. At the receiver on the other hand, the N-point DFT module can be implemented as an N-point Fast Fourier Transform (FFT).

In another aspect, the present disclosure relates to a method for transmitting information from a transmitter to a receiver along a channel comprising the steps of generating, at the transmitter, source coded symbols from information to be transmitted by the transmitter; multiplying, at the transmitter, the generated source coded symbols with M preset values to generate a first set of multiplied samples; processing, at the transmitter, the first set of multiplied samples to obtain a first set of inverse discrete Fourier transform (IDFT) samples for onward transmission to the receiver; processing, at the receiver, the received first set of IDFT samples to obtain a first set of DFT samples; and multiplying, at the receiver, the first set of DFT samples with reciprocal of the M preset values to generate the source coded symbols.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
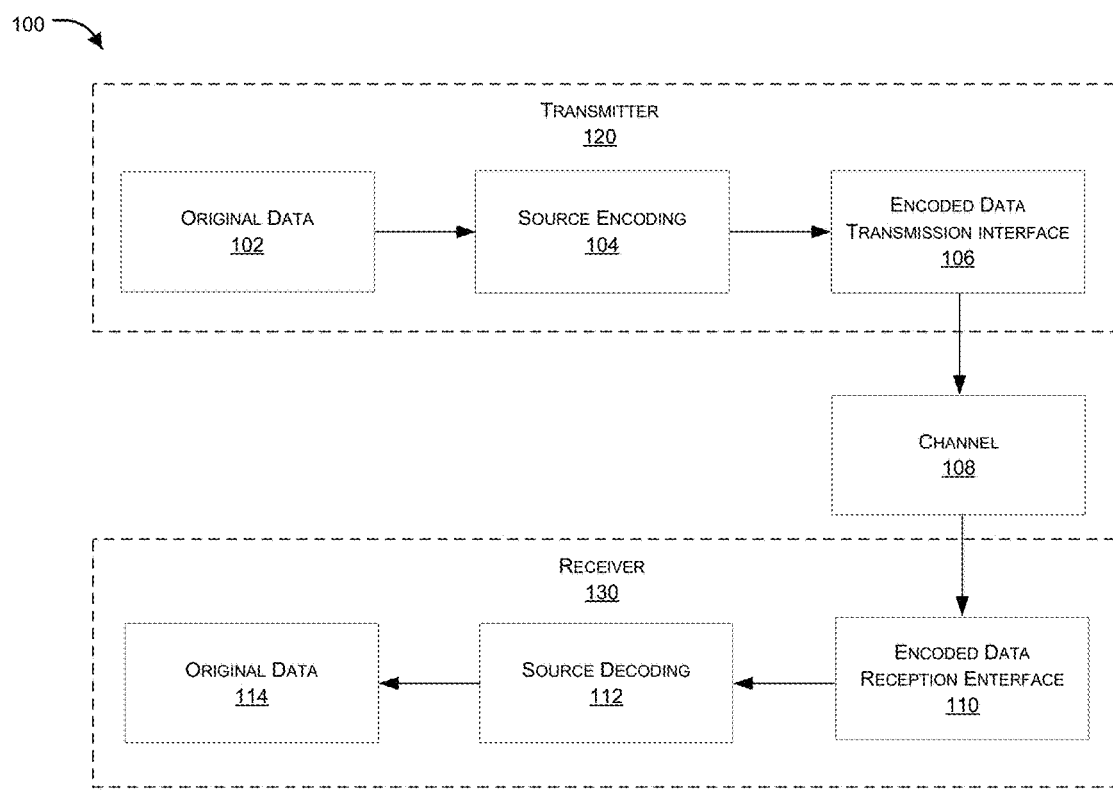
FIG. 1 illustrates an exemplary block diagram of an existing transmitter and receiver in a communication network that can be modified to achieve low PAPR value in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims define a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure generally relates to a wireless communication system that provides lower peak to average power ratio (PAPR). In particular, the present disclosure pertains to communication systems and methods for achieving low peak to average power ratio (PAPR) for transmitted symbols of wireless devices.

In an aspect, the present disclosure relates to a transmitter of a communication system, wherein the transmitter can include a source encoding module that is configured to generate source coded symbols from information to be transmitted by the transmitter, a preset values based multiplication module that is configured to multiply M symbols from the generated source coded symbols with M preset values to generate a first set of multiplied samples, and an N-point IDFT module that is configured to process the first set of multiplied samples to obtain a first set of inverse discrete Fourier transform (IDFT) samples for onward transmission to a receiver.

In an aspect, the preset values based multiplication module can be further configured to split source coded symbols into a plurality of blocks, each block having M samples, wherein each block can be multiplied sample by sample with the M preset values to generate the first set of samples. In another embodiment, the M preset values can be obtained from any or a combination of mathematical distribution(s). Examples of such mathematical distribution(s) include but are not limited to Gaussian distribution, Soliton distribution, Rayleigh distribution, Rician distribution, Inverse Gaussian distribution, Raised Cosine distribution, and Root raised Cosine distribution.

In another aspect, the receiver can include an N-point DFT module that can be configured to process the received first set of IDFT samples to obtain a first set of DFT samples, and an inverse preset values based multiplication module that can be configured to multiply the first set of DFT samples with reciprocal of the M preset values to generate the source coded symbols. In another aspect, the receiver can further include a source decoding module that is configured to decode the source coded symbols to retrieve the information transmitted by the transmitter. According to an embodiment, the receiver can further be configured to filter the received first set of IDFT samples to correct noise before processing the received first set of IDFT samples. In an aspect, the transmitter and the receiver can be connected through a communication channel.

According to one embodiment, one or more zeros can be appended to the first set of multiplied samples before conversion to the first set of IDFT samples to enable compression in frequency domain. According to another embodiment, sub-carrier mapping can be performed on the first set of multiplied samples before conversion to the first set of IDFT samples to enable compression in frequency domain.

In an aspect, the N-point IDFT module can be implemented as an N-point Inverse Fast Fourier Transform (IFFT), wherein N>=M. At the receiver on the other hand, the N-point DFT module can be implemented as an N-point Fast Fourier Transform (FFT).

In another aspect, the present disclosure relates to a method for transmitting information from a transmitter to a receiver along a channel comprising the steps of generating, at the transmitter, source coded symbols from information to be transmitted by the transmitter; multiplying, at the transmitter, the generated source coded symbols with M preset values to generate a first set of multiplied samples; processing, at the transmitter, the first set of multiplied samples to obtain a first set of inverse discrete Fourier transform (IDFT) samples for onward transmission to the receiver; processing, at the receiver, the received first set of IDFT samples to obtain a first set of DFT samples; and multiplying, at the receiver, the first set of DFT samples with reciprocal of the M preset values to generate the source coded symbols.

FIG. 1 illustrates an exemplary block diagram 100 of an existing transmitter and receiver in a communication network that can be modified to achieve low PAPR value in accordance with an embodiment of the present disclosure. A typical communication architecture/flow involves reception of original data 102 that needs to be transmitted by a transmitter 120 to a receiver 130, source encoding 104 of the original data 102, and transmission, at interface 106, of the encoded data through channel 108 to a receiver interface 110 of receiver 130. At receiver 130, received encoded data can be forwarded to a decoder for performing source decoding 112 to retrieve the original data 114, which should be same as the original data 102.

Embodiments of the present disclosure can be employed in/with the transmitter 120 for achieving low PAPR value. In an example implementation, transmitter 102 can use one or more of the existing source encoding techniques including but not limiting to Hoffman encoding, for compressing/ encoding the source data in order to transmit the encoded data over transmission channel more efficiently. Source encoding 104 can be performed for efficient transmission of original data 102 over available channels. Source encoding 104 can be performed on original data 102 so as to reduce the number of bits required to represent and transmit the original data 102 over the channel 108, which may have limited bandwidth. In example implementations, source code encoding can be performed in conjunction with analog-to-digital conversion, in case the original data 102 is received in analog form. Source encoding can be performed to represent original data 102 in digital format by using as few bits as possible. By source encoding 104 of the original data 102, transmitter 120 can transmit more data per unit time over the same channel 108.

In an example implementation, based on the type of data that needs to be transmitted, transmitter 120 of the present disclosure can select one or another suitable source encoding technique. Furthermore, in order to enhance efficiency of communication and to utilize the channel 108 to its maximum potential, a suitable channel encoding technique can be selected. Encoding data can be transmitted through a transmission interface 106 of the transmitter 120 over one or more available channels 108. In an example implementation, it is possible that portions of encoded data are transmitted in parallel over two or more channels 108 or sub-channels available between the transmitter 120 and receiver 130. In an example implementation, one or more suitable channel or sub-channel mapping techniques can be used for mapping portions of encoded data over one or more available channels/sub-channels 108. Channel(s) or sub-channels in the present disclosure have been used interchangeably to refer to all available channels 108 between transmitter 120 and receiver 130. Although most of the embodiments of the present disclosure have been explained with reference to a wireless communication involving a wireless transmitter and a wireless receiver, a wired communication network can also be configured to use the teaching of the present disclosure so as to receive low PAPR ratio.

In an example implementation, receiver 130 can receive encoded data transmitted from channel 108, and perform source decoding 112 to get the original data 114. In an example implementation, original data 114 and original data 102 should be same data/message that the transmitter 120 intended to send to the receiver 130.

For achieving low PAPR value, transmitter 120 can use teachings the present disclosure, wherein the transmitter 120, after source encoding 104 of original data 102, can split the source coded symbols (obtained after source encoding 104) into different blocks having M samples each and then multiply each input block, sample by sample, with M preset values in, say a multiplication block. Transmitter 120 can then perform an N-point discrete fourier transformation (IDFT) for obtaining IDFT transformed samples, which can be transmitted through a transmission interface such as 106 over a channel such as 108 to the receiver 130. In an exemplary implementation, the IDFT transformed samples can be generated using Inverse Fast Fourier Transform (IFFT) algorithm, and then transmitted by the transmission interface 106 serially over a selected channel 108. In another exemplary implementation, portions of the IDFT transmitted samples can be transmitted by the transmission interface 106 in parallel over one or more available channels/sub-channels.

In an aspect, receiver 130 receives the IDFT transformed samples over an encoded data reception interface 110. In case the IDFT transformed samples are received in parallel from one or more channels, the encoded data reception interface 110 can assemble the received IDFT transformed samples. Before decoding the samples, received data samples can be processed by an N-point DFT (for instance by employing FFT algorithm) technique to obtain a first set of DFT transformed samples, which can further be processed by an inverse multiplication block where the first set of DFT transformed samples can be multiplied with reciprocals of M preset values used at the transmitter. After such inverse multiplication, a suitable source decoding 112 can be performed to obtain original data 114 at the receiver 130.

With reference to FIG. 2, embodiments of the present disclosure can provide a communication system for achieving low PAPR value for transmitted symbols from a transmitter to a receiver. The proposed communication system 200 can include a transmitter side sub-system 202 that is configured to process signal/data to be transmitted, and a receiver side sub-system 252 that is configured to process the received signal/data to generate/obtain the original signal/data.

Figure 2A:
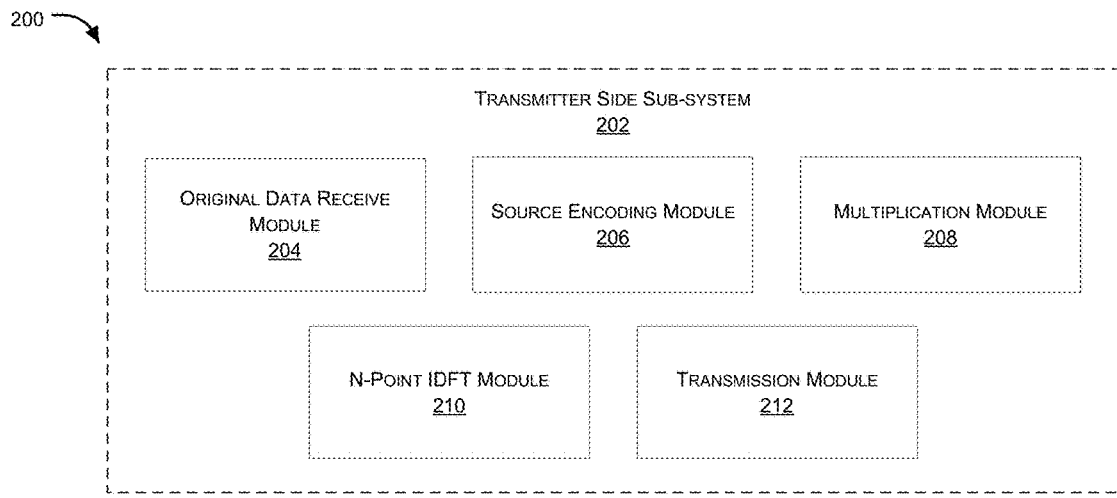
FIG. 2A illustrates an exemplary module diagram of transmitter side sub-system of communication system for achieving low PAPR value in accordance with an embodiment of the present disclosure.

FIG. 2A illustrates an exemplary module diagram of transmitter side sub-system 202 of the proposed communication system 200 for achieving low PAPR value in accordance with an embodiment of the present disclosure. As shown in FIG. 2A, the transmitter side sub-system 202 can include an original data receive module 204 that can be configured to receiver an original signal/data/message to be transmitted, a source encoding module 206 (interchangeably referred to as source encoder 206, hereinafter) that can be configured to perform source encoding to represent the original data using as many few bits as possible in digital format, a multiplication module 208 (interchangeably referred to as a preset values based multiplier 208, hereinafter) that can be configured to multiply M source coded symbols obtained from source encoding module 206 with M preset values to obtain a first set of multiplied samples, and an N-point IDFT module 210 (interchangeably referred as an N-point IDFT transformer 210, hereinafter) that is configured to perform inverse DFT (IDFT) over the first set of multiplied samples to get a first set of IDFT transformed symbols, and a transmission module 212 that is configured to transmit the first set of IDFT transformed symbols over the available channel(s) to a receiver.

In an example implementation, original data receive module 204 can be configured to receive digital data as well as analog signal. In case the original data receive module 204 receives analog signal, an analog to digital converter (ADC) can be incorporated with the original data receiving module 204 and can be used for transforming the analog signal into digital signal by presenting the resultant signal with help of binary codes or symbols.

In an example implementation, source encoding module 206 can be configured to encode the original data (as received from the original data receiving module 204), wherein source encoding can be performed for minimizing the data bits that are required to present a given original data using as many minimum bits as possible. Using source encoding module 206, redundant bits present in the original data can be removed or suppressed. In an example implementation, source encoding module 206 can be configured to perform loss-less compression. In another example implementation, source encoding module 206 can be configured to perform Hoffmann encoding of the received original data. Output of the module 206 can generate a plurality of source-coded symbols.

Source coded symbols as generated by the source encoding module 206 can then be processed by multiplication module 208, also referred to as preset values based multiplication module 208 hereinafter, that can be configured to multiply M source coded symbols (M symbols selected from the total number of source coded symbols generated by the module 206) obtained from source encoding module 206 with M preset values to obtain a first set of multiplied samples. In an aspect, the source coded symbols can be split into different blocks having M samples each, wherein each block can then be multiplied sample by sample by the M preset values in the multiplication block to generate the first set of multiplied samples having M samples, for instance.

In an exemplary implementation, required number of zeros can also be appended and/or sub-carrier mapping be performed, if necessary, before sending the first set of multiplied samples to the N-point IDFT module 210 (which performs IDFT operation using N points). For instance, transmitter sub-system 202 of the present disclosure can include a sub-carrier mapping module that can map each of the M samples of the first set of multiplied samples in conjunction with Q-code and Q-frequency values to one of the N (>M) orthogonal subcarriers that can be transmitted. A typical value of N can be 256 subcarriers, and M=N/Q is an integer multiple of M and Q is the bandwidth expansion factor of the symbol sequence. If all terminals transmit M symbols per block, the system can handle Q simultaneous transmissions without co-channel interference. In an example implementation, sub-carrier mapping module can also append N-M zeros to the first set of multiplied samples if N is greater than M (M coming from the M-point DFT operation).

In an aspect, the N-point IDFT module 210 can be configured to perform inverse DFT (IDFT) over the first set of multiplied samples to obtain a first set of IDFT transformed symbols. In an exemplary implementation, the N-point IDFT module 210 can transform the first set of multiplied samples into first set of IDFT transformed symbols. In an example implementation, the N-point IDFT module 210 can be configured to transform sub-carrier amplitudes to a complex time domain signal, wherein each such complex time domain signal can then modulate a single frequency carrier, and the modulated symbols can ultimately be transmitted sequentially.

In an exemplary implementation, the first set of IDFT transformed symbols can be transmitted through transmission module 212 over one or more channels or sub-channel. In an exemplary implementation, transmission module 212 can be configured to use OFDM scheme, for instance, and transmit the first set of IDFT transformed symbols as ODFM symbols. In another example implementation, transmission module 212 can be configured to select an appropriate channel and/or sub-channel(s), and transmit the first set of IDFT transformed symbols in sequence. In another example implementation, transmission module 212 can be configured to use one or more channels and/or sub-channels to send portions of transformed data symbols in parallel.

On receiving the IDFT transformed symbols from the channel(s), the receiver can transform the received signal into frequency domain via N-point DFT to obtain a first set of DFT samples, followed by multiplication of the first set of DFT samples with reciprocal of the M preset values to generate the source coded symbols. In an exemplary implementation, source decoding can be performed to obtain the original data/signal.

Figure 2B:
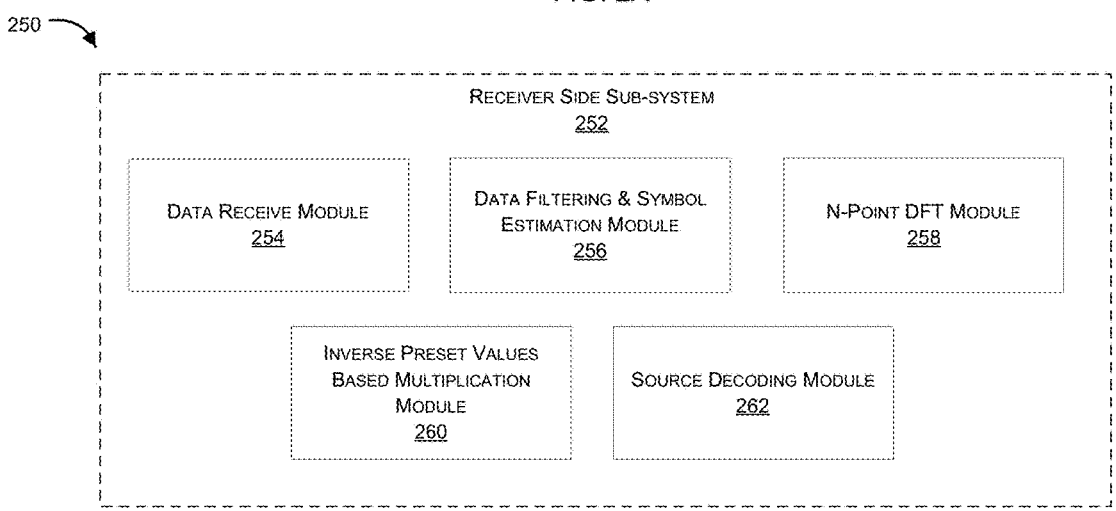
FIG. 2B illustrates an exemplary module diagram of a receiver side sub-system of communication system for achieving low PAPR in accordance with an embodiment of the present disclosure.

FIG. 2B illustrates an exemplary module diagram 250 of a receiver side sub-system 252 of communication system for achieving low PAPR in accordance with an embodiment of the present disclosure. As shown in FIG. 2B, receiver side sub-system 252 can include a data receive module 254 that is configured to receive the first set of IDFT transformed symbols as transmitted by the transmitter, a data filtering and symbol estimation module 256 that is configured to apply one or more filters to correct any noise that may have been introduced during transmission and estimate the symbols by sampling the received symbols/IDFT transformed data, an N-Point DFT module 258 that can be configured to perform DFT over the filtered symbols to transform the filtered symbols into frequency domain to get a first set of DFT transformed symbols, an inverse preset values based multiplication module 260 that can be configured to multiply the first set of DFT transformed samples with reciprocal of the M preset values to generate the source coded symbols, and a source decoding module 262 that can be configured to perform decoding of symbols obtained from the inverse multiplication block to obtain the original symbols/data/message.

In an example implementation, data receive module 254 can be configured to collect symbols from one or more channels, and compile the symbols for further processing by the other subsequent modules. In an example implementation, data filtering & symbol estimation module 256 can be configured to apply one or more data filters such as low-pass filters, high-pass filters, Savitzky-Golay filter, among others to correct/remove any noise that may have been introduced during transmission of symbols. In an example implementation, the data filtering and symbols estimation module 256 can be configured to estimate the received symbols by sampling the received symbols/first IDFT transformed data as transmitted by the transmitter.

In an example implementation, N-point DFT module 258 can be configured to apply discrete Fourier transform, such as FFT over the filtered symbols to convert the filtered symbols into frequency domain. The N-Point DFT module 258 can apply discrete Fourier transformation functions, such as Fast Fourier Transform (FFT) over the filtered symbols received from the data filtering & symbol estimation module 256 to obtain a second set of DFT transformed symbols or data bits. In an example implementation, N-point DFT module 258 can be configured to convert the time domain signal as received from the data filtering & symbol estimation module 256 into frequency domain.

One can appreciate that by using one more mode modules of the present disclosure, the receiver side subsystem can perform de-spreading in the time domain. In an example implementation, the N-Point DFT module 258 can perform an N-point discrete Fourier transform (DFT) to produce a frequency domain representation of the filtered symbols as received from the data filtering & symbol estimation module 256.

In an example implementation, the receiver sub-system can include a sub-carrier de-mapping module that can de-maps each of the N-point DFT outputs, in conjunction with Q-code and Q-frequency values to one of the N (>M) orthogonal subcarriers that can be transmitted. In an example implementation, sub-carrier de-mapping module can be configured to remove N-M zeros from the second DFT transformed symbols.

In an example implementation, the first set of DFT transformed symbols or data bits can further be processed by the inverse preset values based multiplication module 260 that can be configured to multiply the first set of DFT transformed samples with reciprocal of the M preset values to generate the source coded symbols. Such source coded symbols can then be processed by the decoding module 262 to obtain the original symbols/data/message. In an example implementation, source decoding module 262 can be configured to provide data in either digital format or analog format. In case the output is required in analog format, source decoding module 262 can include a digital to analog converter for converting the convolved symbols into an analog signal.

In an aspect, IDFT module of the present disclosure can be configured to convert frequency domain samples to time domain samples, wherein output of the IDFT block/module is N-samples, which can be serialized and then transmitted over the antenna after Digital-to-Analog conversion. The process of serialization and transmission can be in time domain, i.e. these samples are transmitted per symbol duration. Therefore, output of the IDFT module 210 can be interpreted as time domain and input can be like-wise interpreted as frequency domain samples. In view of this interpretation, input to the IDFT block/module, i.e. the result of multiplication of coded symbols with M preset values are frequency domain samples. Each sample/value of M preset values corresponds to a discrete time frequency signal or sinusoid of a particular frequency with amplitude equal to the value of the sample. Multiplication of coded symbols with M preset values can only happen in frequency domain (because we cannot multiply samples from time domain with samples from frequency domain) and therefore the coded symbols must be interpreted as frequency domain samples and further this multiplication can be interpreted as amplifying certain frequency content of the coded symbols.

Figure 3:
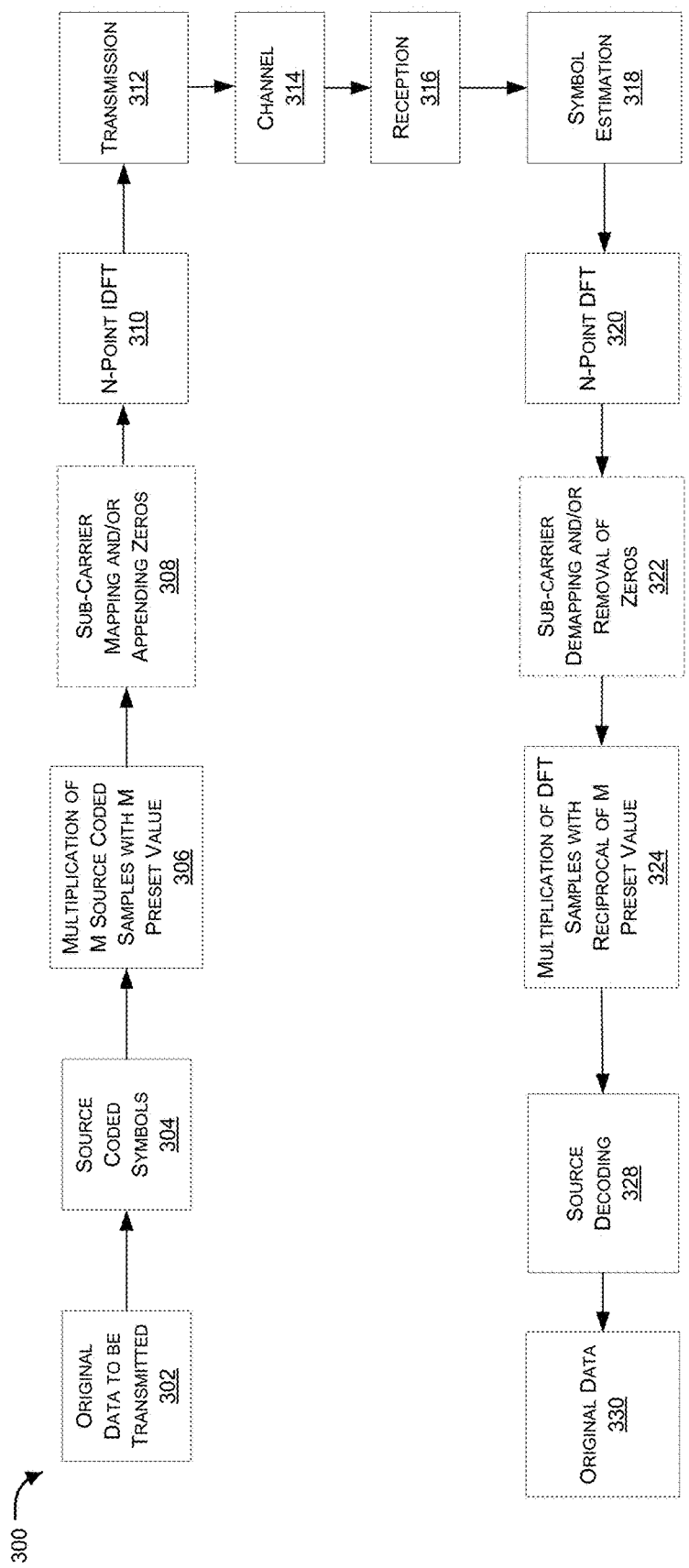
FIG. 3 illustrates an exemplary block diagram of transmitter and receiver deployed in communication network and configured to operate in accordance with an embodiment of the present disclosure.

FIG. 3 illustrates an exemplary block diagram 300 of transmitter and receiver deployed in communication network and configured to operate in accordance with an embodiment of the present disclosure. At block 302, original data to be transmitted is received at the transmitter end, and at block 304, the transmitter can encode the original data into a plurality of source coded symbols, of which, at block 306, M source coded symbols can be multiplied with M preset values to generate a first set of multiplied symbols. At block 308, if configured, sub-carrier mapping can be performed on and/or one or more zeros can be appended to the first set of multiplied symbols. At block 310, at the transmitter end, the first set of multiplied symbols can be processed based on an N-point IDFT operation to give a first set of inverse discrete Fourier transformation (IDFT) samples, which can finally be transmitted by the transmitter at 312 through a channel 314.

At block 316, on the receiver end, the first set of IDFT samples can be received, and at block 318, symbol estimation, if desired can be performed on the first set of IDFT samples to remove noise/error, if any. At block 320, the first set of IDFT samples can be processed based on an N-point DFT operation to give a first set of DFT samples, post which, at block 322, the first set of DFT samples can undergo sub-carrier de-mapping and/or one or more zeros can be removed if the corresponding operation was carried out at transmitter end. At block 324, the first set of DFT samples can be multiplied by the reciprocals of M preset values, post which, at block 326, source decoding that is inverse to the source coding performed at transmitter end can be performed, based on which, at block 328, original data can be processed/obtained by the receiver.

Figure 4:
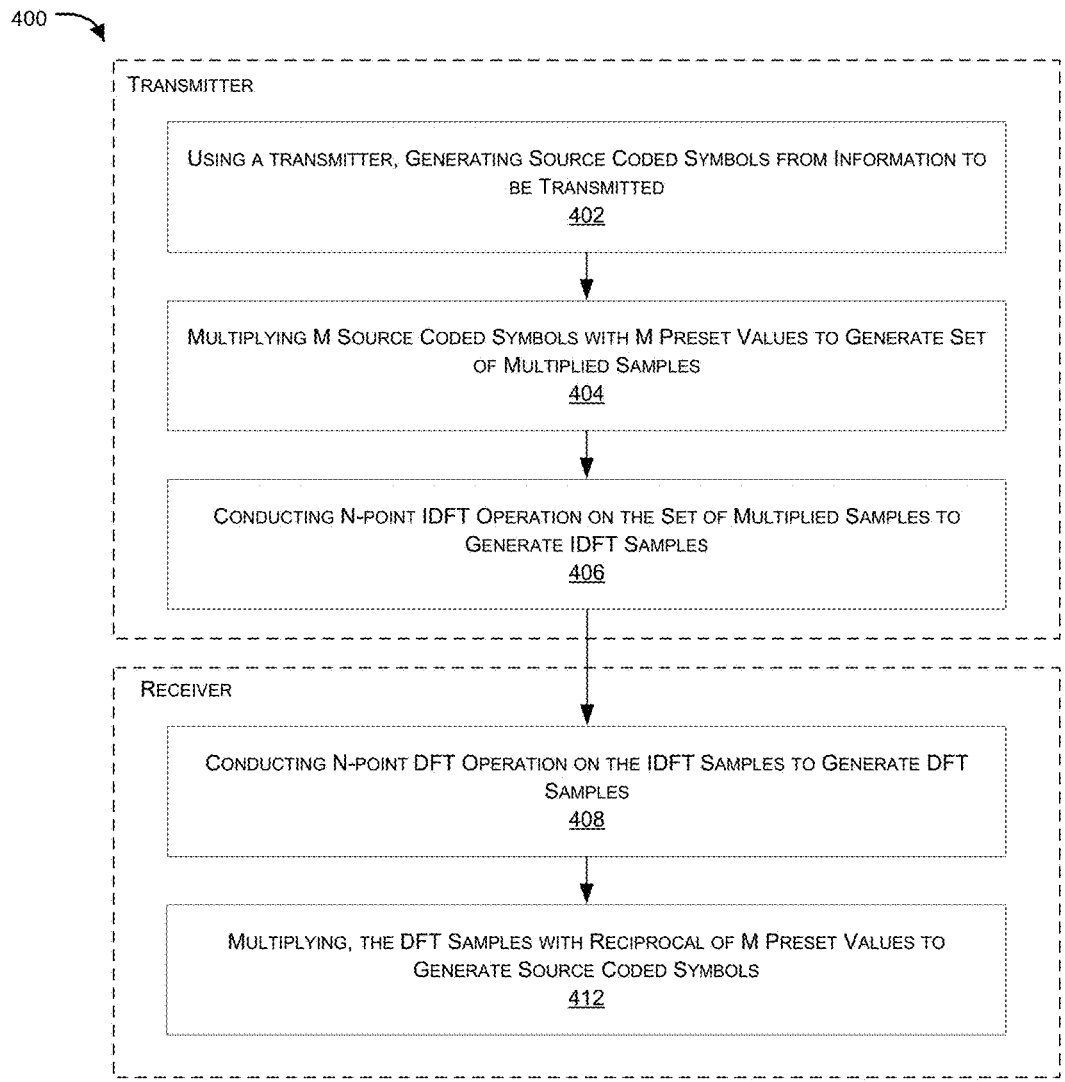
FIG. 4 illustrates an exemplary flow diagram of the proposed communication system/architecture in accordance with an embodiment of the present disclosure.

FIG. 4 illustrates an exemplary flow diagram 400 of a method of communication for achieving low PAPR in accordance with an embodiment of the present disclosure. In an aspect, the method can, at step 402, using a transmitter, generate a plurality of source coded symbols based on information that is intended to be transmitted to a receiver. At step 404, M source coded symbols from the plurality of source coded symbols can be multiplied with M preset values to obtain a first set of multiplied samples. At step 406, at the transmitter, the multiplied samples can be processed based on an N-point IDFT operation to generate a first set of inverse discrete Fourier transform (IDFT) samples for onward transmission to the receiver.

At step 408, at the receiver, the received first set of IDFT samples can be processed based on an N-point DFT operation to obtain a first set of DFT samples, and at step 410, at the receiver, the first set of DFT samples can be multiplied with reciprocal of the M preset values to generate the source coded symbols.

In an aspect of the present disclosure, it is to be noted that M preset values are effective at reducing PAPR when (M−1) frequency domain samples are non-zero and equal, and one frequency domain sample is higher in value. For instance, one example/sample set can be {5,1,1,1,1, . . . , up to M samples}, wherein all domain sample values are 1 except the first one (whose value is 5). In another aspect, a cyclic rotation of these samples is also a valid set; e.g. {1,1,1,5,1, . . . , up to M samples}.

In an instance of the present disclosure, PAPR reduction for a BPSK Constellation can be performed with M=1024 and N=2048. In an aspect, M frequency domain samples (also referred to as preset values) can be denoted as H(w), which, in an exemplary representation can be defined as:

$$H(w)=[1,1,1,\ldots,500,\ldots,1,1,1]$$

Figure 5A:
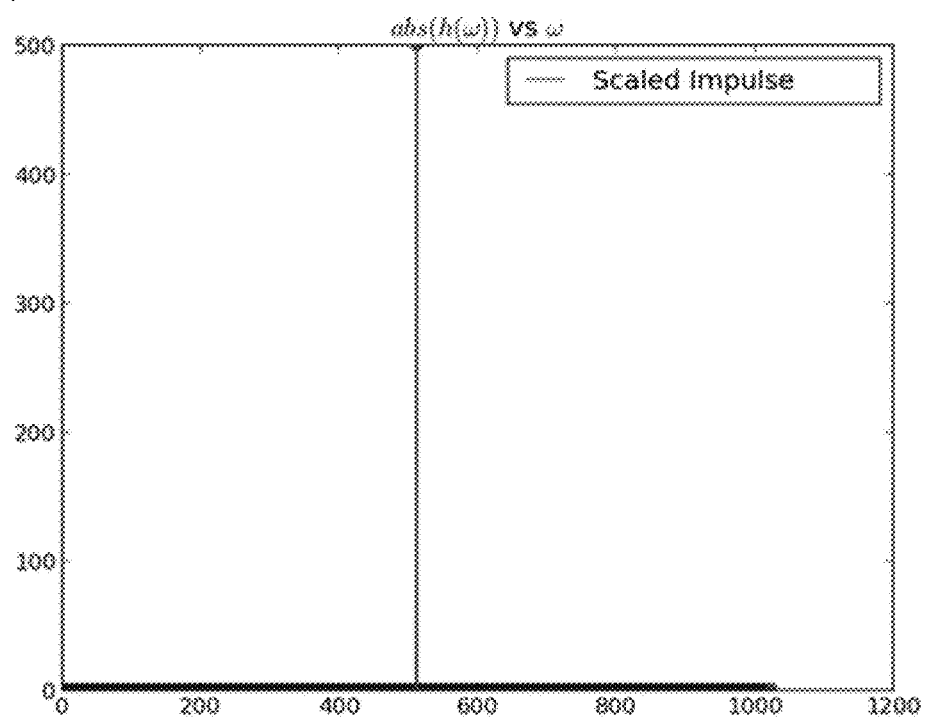
FIG. 5A graphically illustrates M frequency domain samples in accordance with an embodiment of the present disclosure.
Figure 5B:
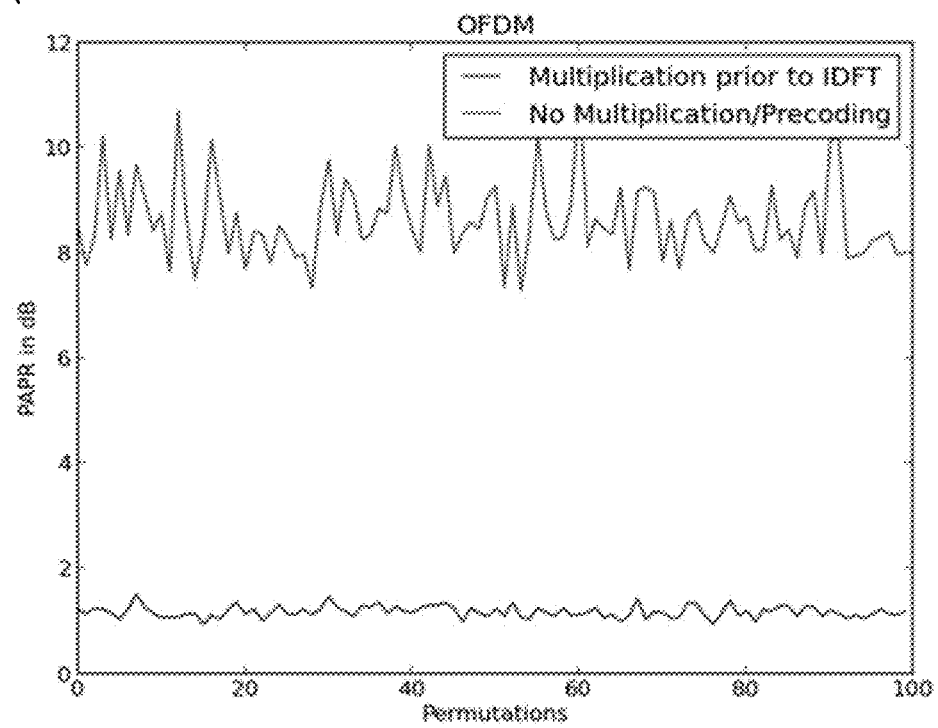
FIGS. 5B to 5C illustrate comparison between proposed invention and prior art with reference to PAPR values.

As can be noticed, the middle sample is much larger in value or amplified or scaled (equal to 500) than all other samples. The other 1023 samples have value 1 each. In an aspect, H(w) can also graphically represented as shown in FIG. 5A. However, it may not be possible to see the samples having value 1 clearly as the middle sample has a relatively large value. In another aspect, PAPR distribution for the case of multiplication by H(w) (preset values) and for the case of no multiplication prior to the IDFT block is given below in FIG. 5B, wherein red line indicates no multiplication and blue line indicates multiplication prior to IDFT (the proposed invention), wherein as can be seen, the PAPR is much lower for the proposed invention where multiplication with M coded symbols is performed with M preset values.

Figure 5C:
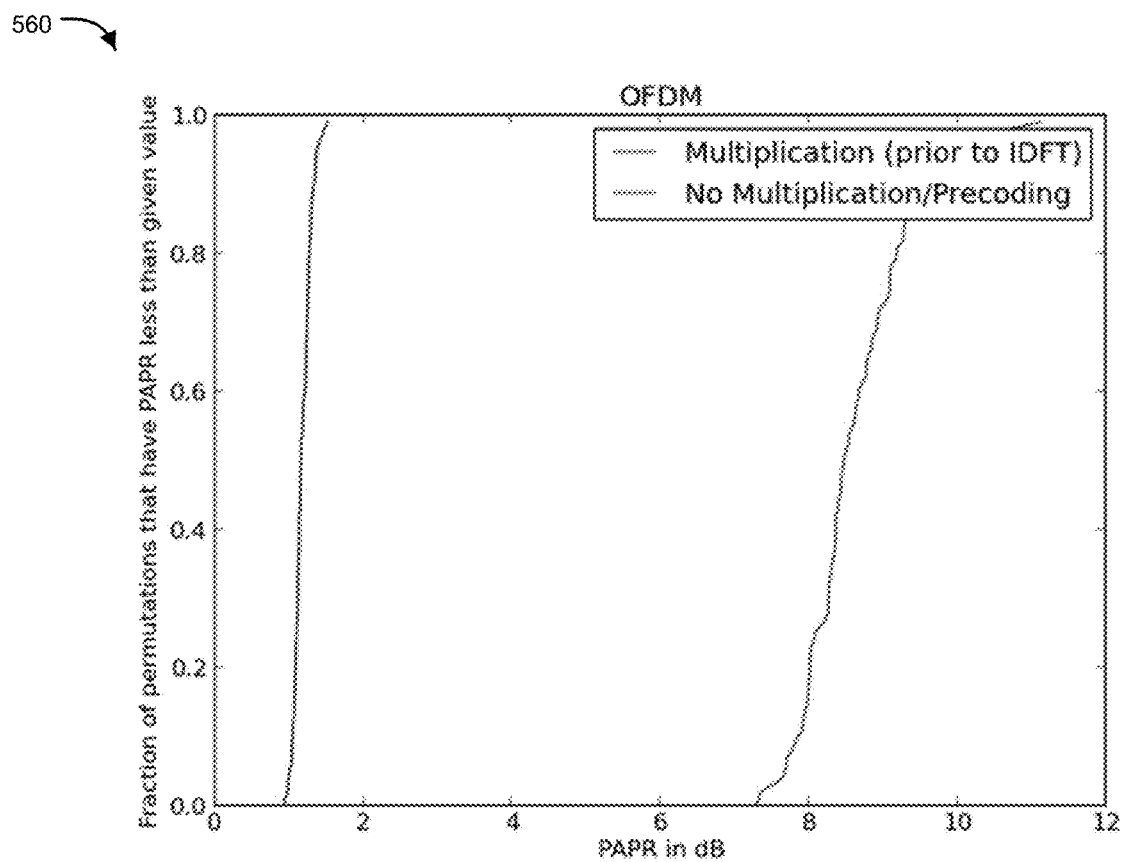

In an aspect, FIG. 5C illustrates cumulative distribution function (cdf) of the PAPR distribution for both cases (with multiplication (shown in blue) and without multiplication (shown in red)). As can be noted, a much larger reduction in PAPR is achieved with multiplication, wherein average reduction in PAPR: 7.4565 dB, and average PAPR with multiplication by H(w): 1.1771 dB.

Figure 6A:
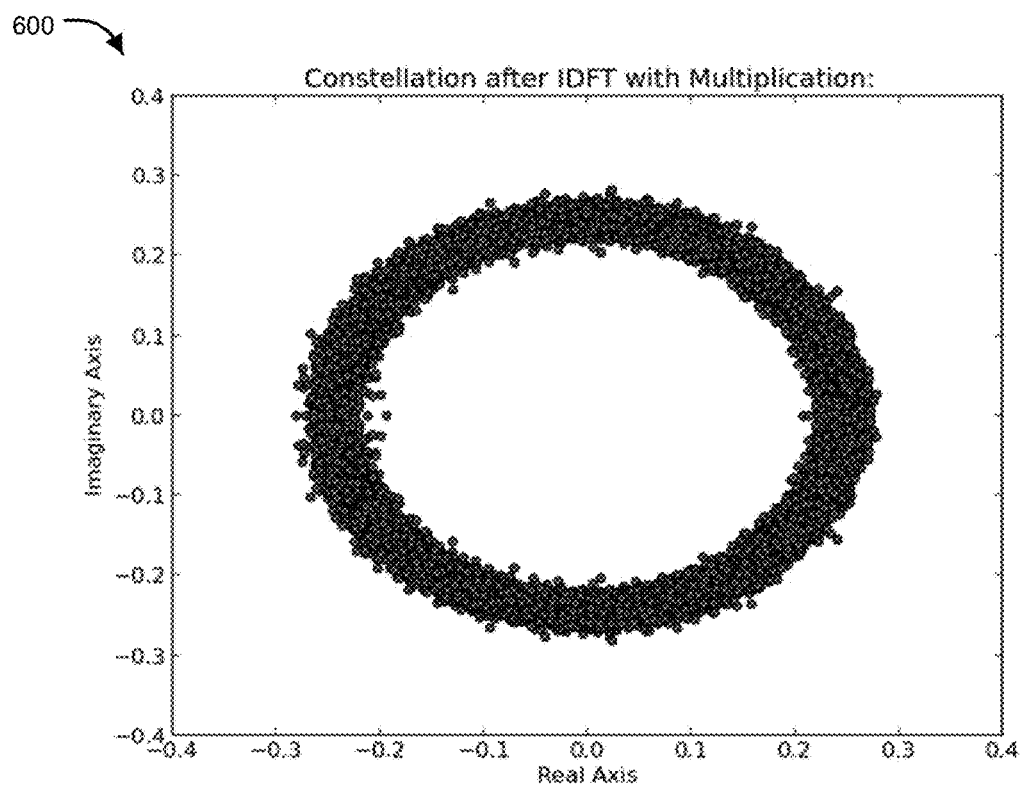
FIGS. 6A and 6B illustrate an exemplary comparison of PAPR values of transmitter that has not applied frequency domain multiplication vs. PAPR values of the proposed inventive transmitter that has applied frequency domain multiplication over the input signal in accordance with an embodiment of the present disclosure.
Figure 6B:
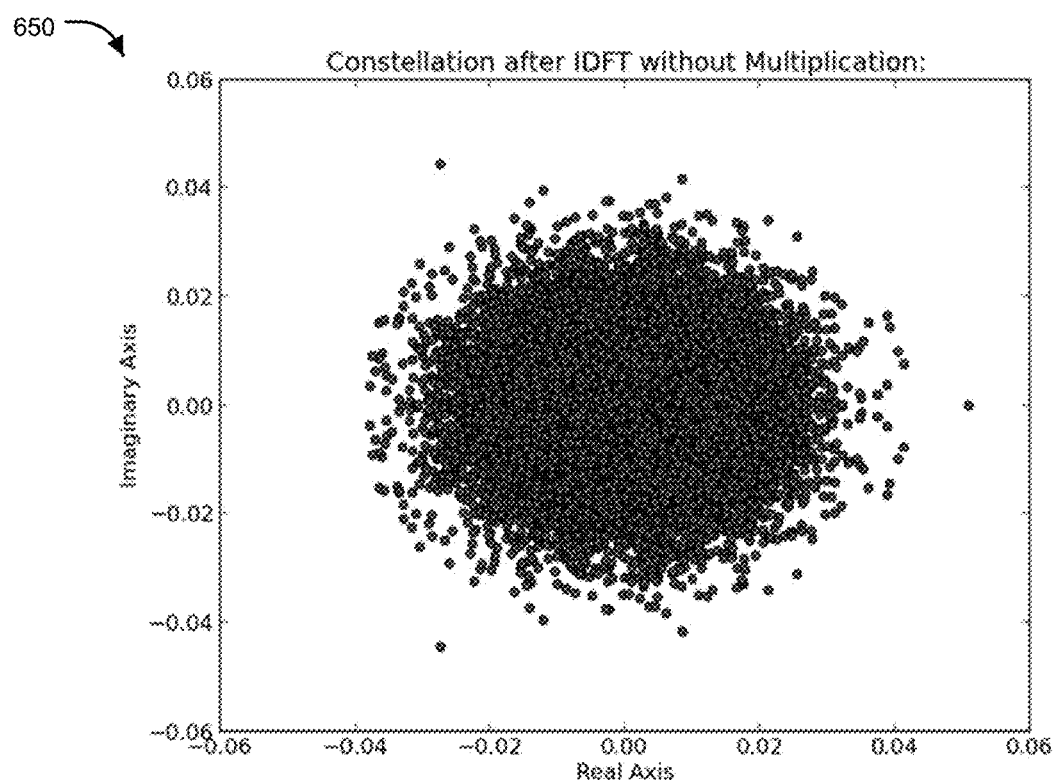

FIG. 6A illustrates output message point constellation after multiplication (proposed invention), whereas FIG. 6B illustrates output message point constellation without multiplication, wherein in FIG. 6A, it can be clearly seen that PAPR values are close to zero. Most samples in the output constellation of FIG. 6A are at approximately the same distance from the origin and have approximately similar power. Thus, the transmitter can transmit each of these samples at the maximum power and achieve greater range. Without multiplication, as shown in FIG. 6B, on the other hand, output points are scattered all over, leading to high PAPR. In an aspect, the same method of PAPR reduction can be used to reduce PAPR for other constellations such as QPSK, 8-PSK, 64-QAM, etc, as well for other values of M and N.

In an aspect, the proposed invention/disclosure reduces the Peak to Average Power Ratio (PAPR) during transmission in communication systems, and also reduces power consumption in equipment transmitting information (for instance in radio-frequency antennae etc.). In an aspect, information can be transmitted over larger distances using the same apparatus and reduces the cost of deploying networks. The proposed invention therefore reduces cost, enables low power usage, and involves lesser number of components.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure provides a communication system and method for achieving low peak to average power ratio over a transmitter of a wireless device.

The present disclosure provides a communication system and method for achieving low peak to average ratio and minimizing power consumption of the transmitter/access points.

The present disclosure provides a transmitter having a low PAPR value, which provides wide coverage.

The present disclosure provides a method and system for maximum or optimal use of transmitter and communication channels.

We claim:

1. A transmitter of a communication system, wherein the transmitter comprises:
   a source encoder configured to generate source coded symbols from information to be transmitted by the transmitter;
   a preset values based multiplier configured to split the source coded symbols into a plurality of blocks, and wherein each block has M samples; and multiply M symbols from the generated source coded symbols with M preset values to generate a first set of multiplied samples, wherein the preset values based multiplier multiplies each block sample by sample with the M preset values to generate the first set of samples; and
   an N-point IDFT transformer configured to process the first set of multiplied samples to obtain a first set of inverse discrete Fourier transform (IDFT) samples for onward transmission to a receiver;
   wherein M and N are integers, and $N \geq M > 1$.

2. The transmitter of claim 1, wherein the receiver: receives and processes the first set of IDFT samples to obtain a first set of DFT samples; and multiplies the first set of DFT samples with reciprocal of the M preset values to generate the source coded symbols.

3. The transmitter of claim 1, wherein the transmitter and the receiver are connected through a communication channel.

4. The transmitter of claim 1, wherein the receiver decodes the source coded symbols to retrieve the information transmitted by the transmitter.

5. The transmitter of claim 1, wherein the M preset values are obtained from any or a combination of mathematical distribution, Gaussian distribution, Soliton distribution, Rayleigh distribution, Rician distribution, Inverse Gaussian distribution, Raised Cosine distribution, and Root raised Cosine distribution.

6. The transmitter of claim 1, wherein one or more zeros are appended to the first set of multiplied samples before conversion to the first set of IDFT samples to enable compression in frequency domain.

7. The transmitter of claim 1, wherein sub-carrier mapping is performed on the first set of multiplied samples before conversion to the first set of IDFT samples to enable compression in frequency domain.

8. The transmitter of claim 1, wherein the receiver filters the received first set of IDFT samples to correct noise before processing the received first set of IDFT samples.

9. The transmitter of claim 1, wherein the N-point IDFT transformer is implemented as an N-point Inverse Fast Fourier Transform (IFFT), wherein $N \geq M$.

10. The transmitter of claim 1, wherein the receiver is obtains N-point Fast Fourier Transform (FFT) samples.

11. A method for transmitting information from a transmitter to a receiver along a channel comprising the steps of:
    generating, at the transmitter, source coded symbols from information to be transmitted by the transmitter;
    splitting, at the transmitter, the source coded symbols into a plurality of blocks, wherein each block has M samples;
    multiplying, at the transmitter, the generated source coded symbols with M preset values to generate a first set of multiplied samples, wherein each block is multiplied sample by sample with the M preset values to generate the first set of samples;
    processing, at the transmitter, using an N-point IDFT operation, the first set of multiplied samples to obtain a first set of inverse discrete Fourier transform (IDFT) samples for onward transmission to the receiver;
    processing, at the receiver, using an N-point DFT operation, the received first set of IDFT samples to obtain a first set of DFT samples; and
    multiplying, at the receiver, the first set of DFT samples with reciprocal of the M preset values to generate the source coded symbols;
    wherein M and N are integers, and $N \geq M > 1$.

12. The method of claim 11, wherein, for the transmitter, the N-point IDFT is implemented as an N-point Inverse Fast Fourier Transform (IFFT), and wherein, for the receiver, the N-point DFT is implemented as an N-point Fast Fourier Transform (FFT).

* * * * *